Oct. 28, 1952  P. F. SLOUGH  2,615,274
FISH LURE
Filed Jan. 24, 1952

INVENTOR.
PHILLIP F. SLOUGH
BY Edward M. Apple
ATTORNEY

Patented Oct. 28, 1952

2,615,274

UNITED STATES PATENT OFFICE 2,615,274

FISH LURE

Phillip F. Slough, Detroit, Mich., assignor to L. W. Petrie, Chicago, Ill.

Application January 24, 1952, Serial No. 268,030

5 Claims. (Cl. 43—42.22)

This invention relates to fish lures, and particularly to a fish lure which is adjustable to effect various movements in the water.

An object of the invention is to generally improve devices of the character indicated, and to provide a fish lure which is simple in construction, economical to manufacture, and efficient in operation.

Another object of the invention is the provision of a fish lure which is provided with an adjustable plate positioned in front of the lure body, and arranged to serve as a horizontal fin.

The foregoing and other objects and advantages of the invention will become more apparent as the description proceeds, reference being made from time to time to the accompanying drawings, forming part of the within disclosure, in which drawings.

Figure 1:
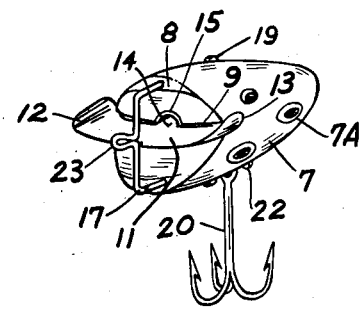
Fig. 1 is a perspective view of the device embodying my invention.
Figure 4:
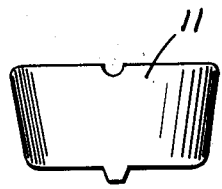
Fig. 4 is a detailed plan view of the plate.
Figure 2:
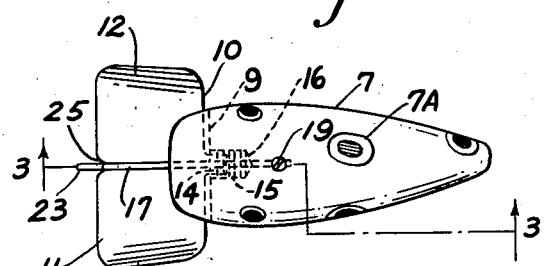
Fig. 2 is a top plan view of the device illustrated in Fig. 1.

Referring now more particularly to the drawing, it will be understood that in the embodiment herein disclosed, my device consists of a lure body 7, which has decorative elements 7A on its outer surface, being substantially circular in cross section, but tapering in thickness toward its opposite ends. The lure body 7 is provided at the front with a recess 8 which simulates the open mouth of a fish. The recess 8 is provided with a rearwardly positioned transverse slot 9, adapted to receive the trailing edge 10 of the plate 11, the latter having upwardly curved ends 12 and 13. The plate 11 has a rearwardly extending projection 14, which is adapted to project into a coil compression spring 15, within a bore 16 extending rearwardly into the body from the recess 8.

Figure 3:
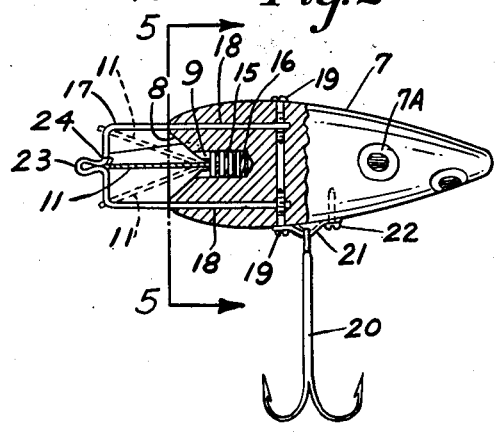
Fig. 3 is a view partly in section taken substantially on the line 3—3 of Fig. 2.
Figure 5:
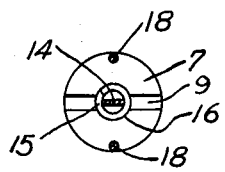
Fig. 5 is a section taken substantially on the line 5—5 of Fig. 3.

A U-shaped wire guard member 17 as shown in Figs. 1 and 3, has the ends thereof inserted in longitudinal bores 18 formed in the front portions of the lure body 7. The ends of the member 17 are notched to accommodate locking screws 19, which extend inwardly from the top and bottom of the lure body 7. A fish hook 20 is suspended from the lure body by any suitable means, such as a loop 21 which is secured in position by the lower screw 19 and the screw 22.

An eye bend 23 in the member 17 provides a place for securing the fish line thereto, and its inner surfaces 24 also serve as a locking recess for receiving the recess 25 formed in the leading edge of the plate 11 when the plate 11 is in its horizontal position as shown by the solid lines in Fig. 3. The plate 11 is adjustable to upper and lower positions as shown by the dotted lines in Fig. 3.

In order to effect the various adjustments of the plate 11, it is necessary to press the plate into the slot 9 and compress the spring 15 until there is clearance between the leading edge of the plate 11 and the member 17. It may then be moved into its upper or lower position.

In operation, when the plate 11 is in the lower position, as shown by the dotted lines in Fig. 3, the lure when moved through the water wobbles horizontally from side to side simulating the movement of a minnow trying to escape.

When the plate 11 is moved into the horizontal position as shown by the solid lines in Fig. 3, the lure when forced through the water will move up and down vertically giving the illusion of a minnow surface feeding, and when the plate 11 is positioned at the top as shown by the dotted lines in Fig. 3, the lure has a tendency to jump out of the water simulating a small fish or frog jumping after flies or bugs.

Although I have disclosed a certain embodiment of my invention, it will be understood that certain modifications may be made, all of which are within the contemplation of the invention, and intended to be within the scope of the appended claims.

Having described my invention, what I claim and desire to secure by Letters Patent is:

1. In a device of the character described, the combination of a body member having a recess in one end adapted to simulate the open mouth of a fish and a slot communicating with said recess to receive a plate, a plate having an edge in said slot, said body member having a bore, a compression spring in said bore adapted to abut against said plate, and means for holding said plate in various adjusted positions.

2. In a device of the character described, the combination of a body member having a recess in one end adapted to simulate the open mouth of a fish and a slot communicating with said recess to receive a plate, a plate having an edge in said slot, said body member having a bore, a compression spring in said bore adapted to abut against said plate, and means for holding said plate in various adjusted positions, said last named means consisting of a U-shaped wire member, secured to the said body along the median line thereof.

3. In a device of the character described, the combination of a lure body, the leading end of said body having a recess therein, a plate swingably mounted in said recess, said body having a bore, a compression spring in said bore adapted to abut said plate, and a U-shaped wire member secured to said body and extending around said plate, said U-shaped member having an eye therein adapted to receive a fish line.

4. In a device of the character described, the combination of a lure body having a fish hook secured thereto, the leading end of said body having a V-shaped recess, a plate swingably mounted in said recess, said body having a bore in communication with said recess, a compression spring in said bore adapted to abut the trailing edge of said plate, and a U-shaped member secured to said body and adapted to engage the leading edge of said plate.

5. The combination defined in claim 4, in which said plate has a recess therein and said U-shaped member is provided with a centrally positioned eye bend adapted to engage said recess.

PHILLIP F. SLOUGH.

REFERENCES CITED

The following references are of record in the file of this patent:

UNITED STATES PATENTS

| Number | Name | Date |
|---|---|---|
| 1,542,404 | Paulson | June 16, 1925 |
| 2,545,129 | Zeigler | Mar. 13, 1951 |
| 2,578,786 | Davis | Dec. 18, 1951 |